United States Patent [19]
Milazzo

[11] 3,786,911
[45] Jan. 22, 1974

[54] ACCUMULATING TRANSFER CONVEYOR
[75] Inventor: Carl J. Milazzo, Tonawanda, N.Y.
[73] Assignee: Hohl Machine & Conveyor Co., Inc., Buffalo, N.Y.
[22] Filed: Aug. 1, 1972
[21] Appl. No.: 276,980

[52] U.S. Cl. ............................................. 198/219
[51] Int. Cl. ............................................ B65g 25/04
[58] Field of Search .................................... 198/219

[56]  References Cited
UNITED STATES PATENTS
3,500,992  3/1970  Tabor .................................. 198/219
3,590,987  7/1971  Evans .................................. 198/219
3,687,275  8/1972  Broser ................................ 198/219

Primary Examiner—Richard E. Aegerter
Attorney, Agent, or Firm—Christel & Bean

[57] ABSTRACT

A plurality of article transfer mechanisms are mounted on a carriage for movement therewith in a rectangular path relative to a conveyor frame and, when in their operative positions, are adapted to advance articles from rest positions on the frame to successive next adjacent rest positions toward the conveyor discharge. An article sensing arm at each rest position, connected to a disabling arm, is responsive to the presence of an article at that position to displace the disabling arm in a manner maintaining the associated transfer mechanism in a disabled condition, precluding transfer of the preceding article to the blocked position.

18 Claims, 15 Drawing Figures

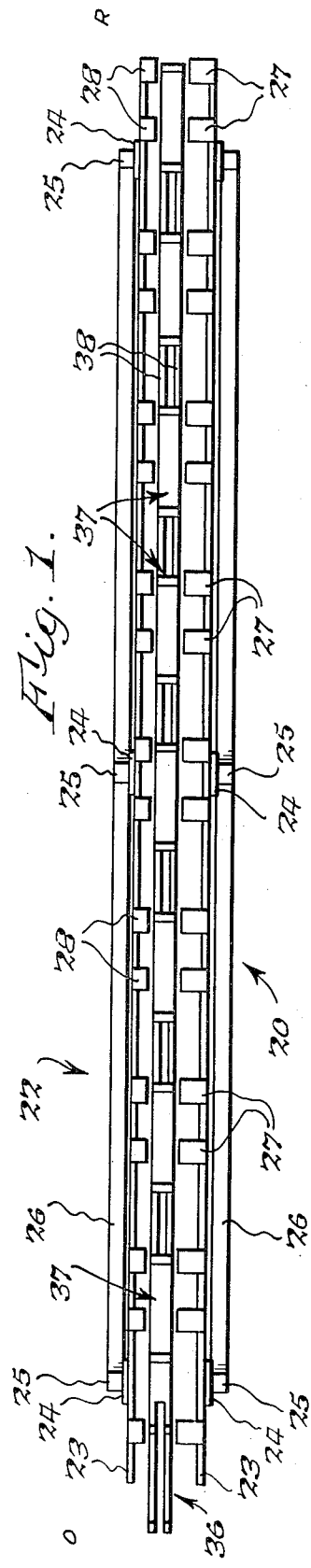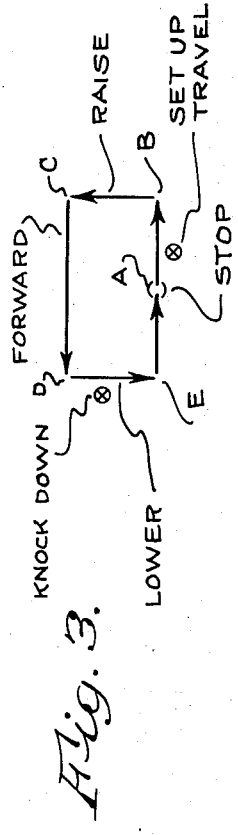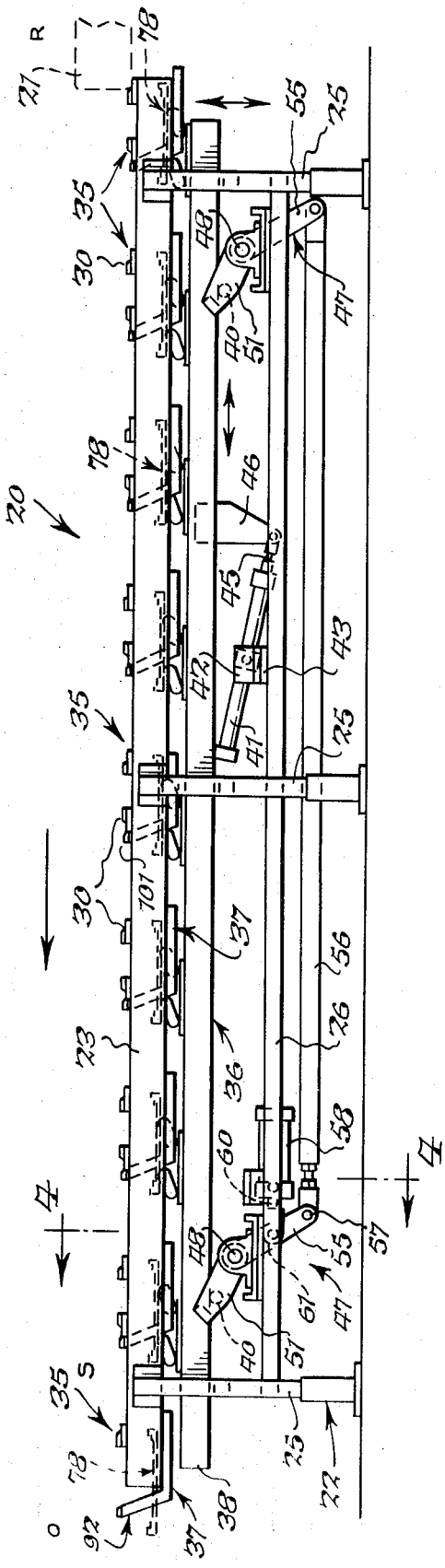

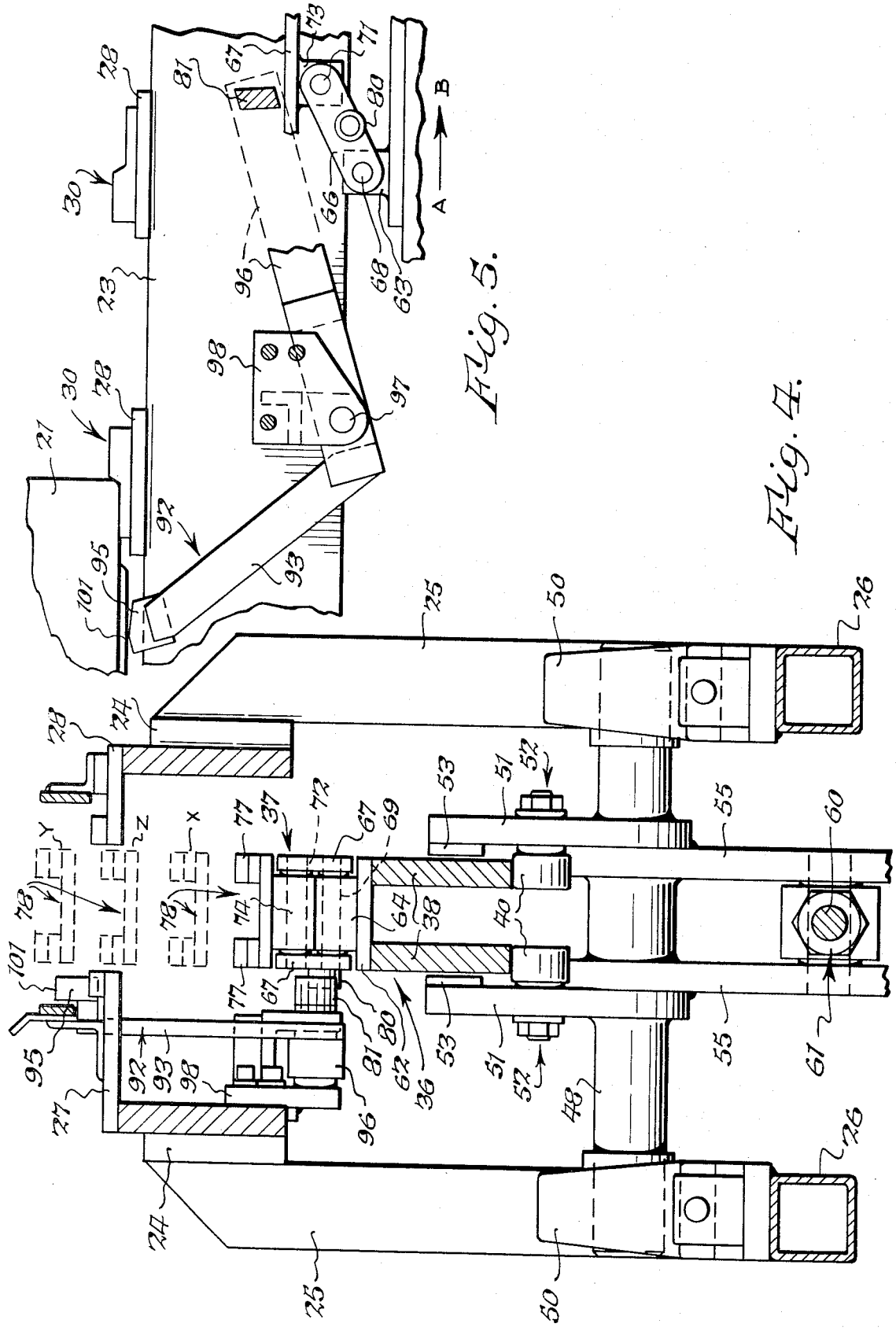

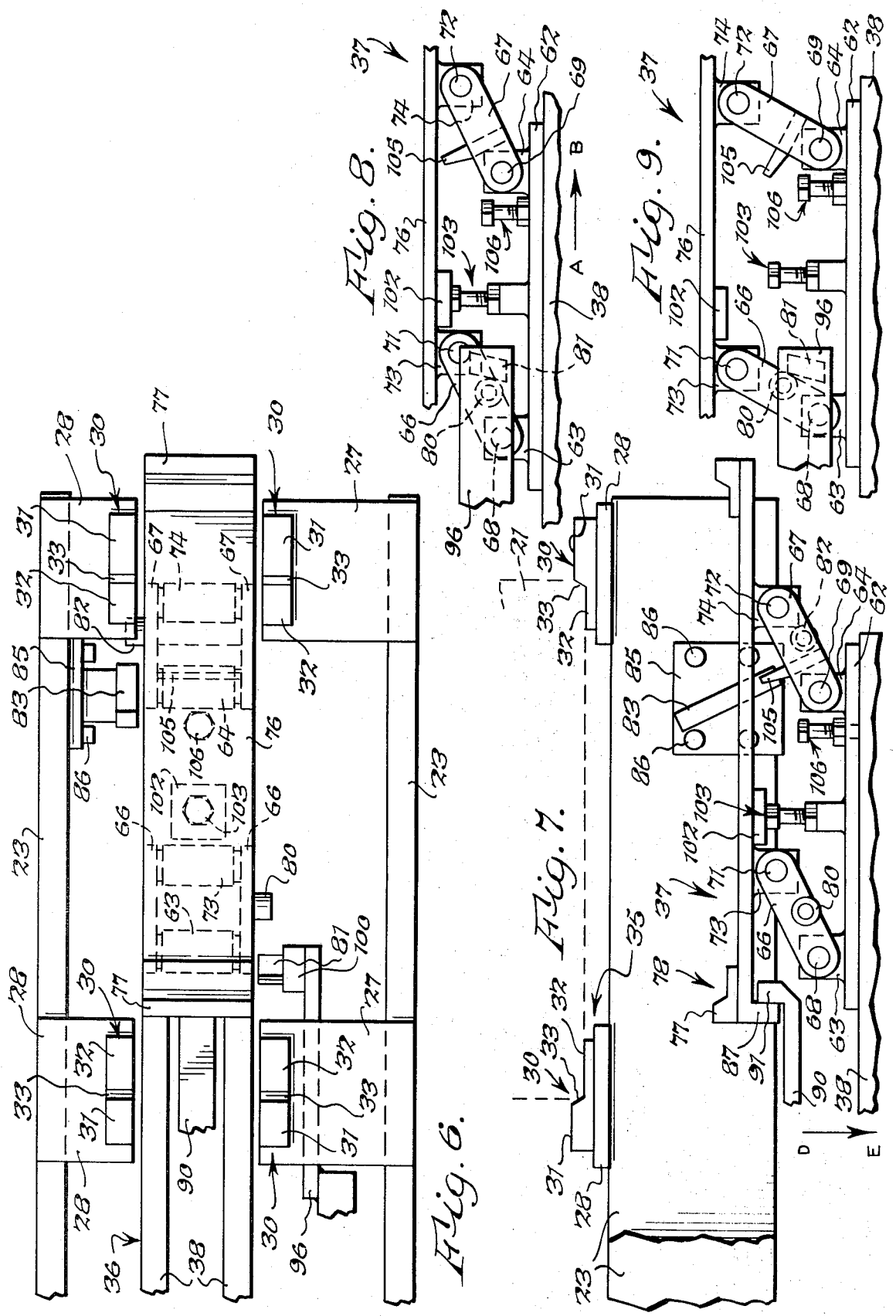

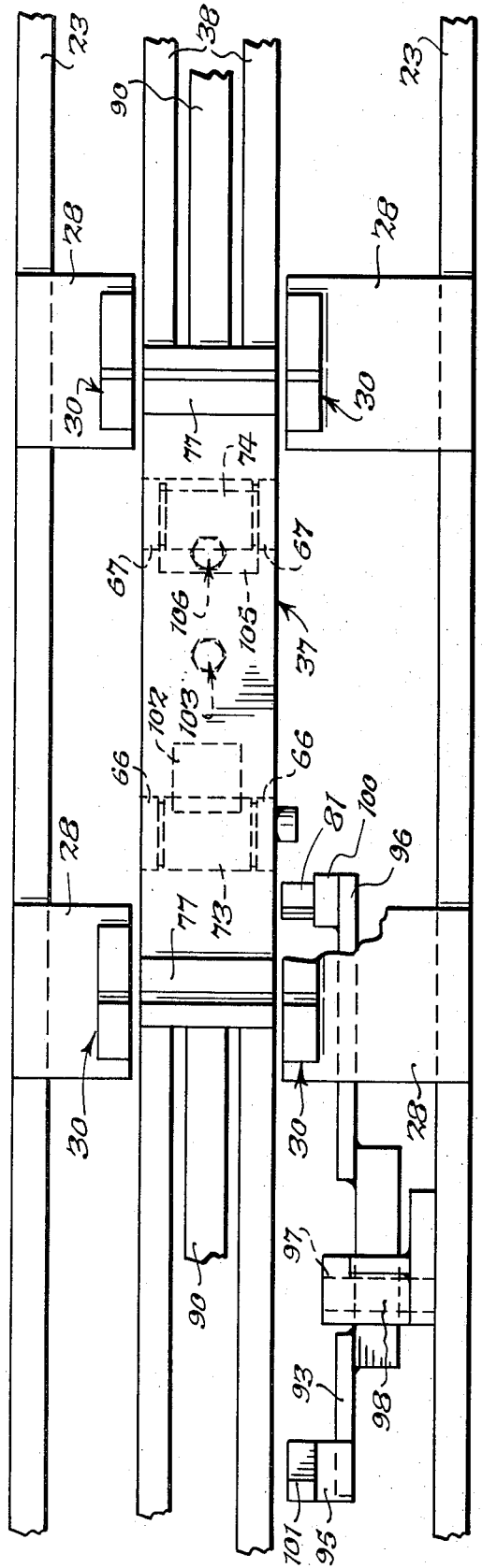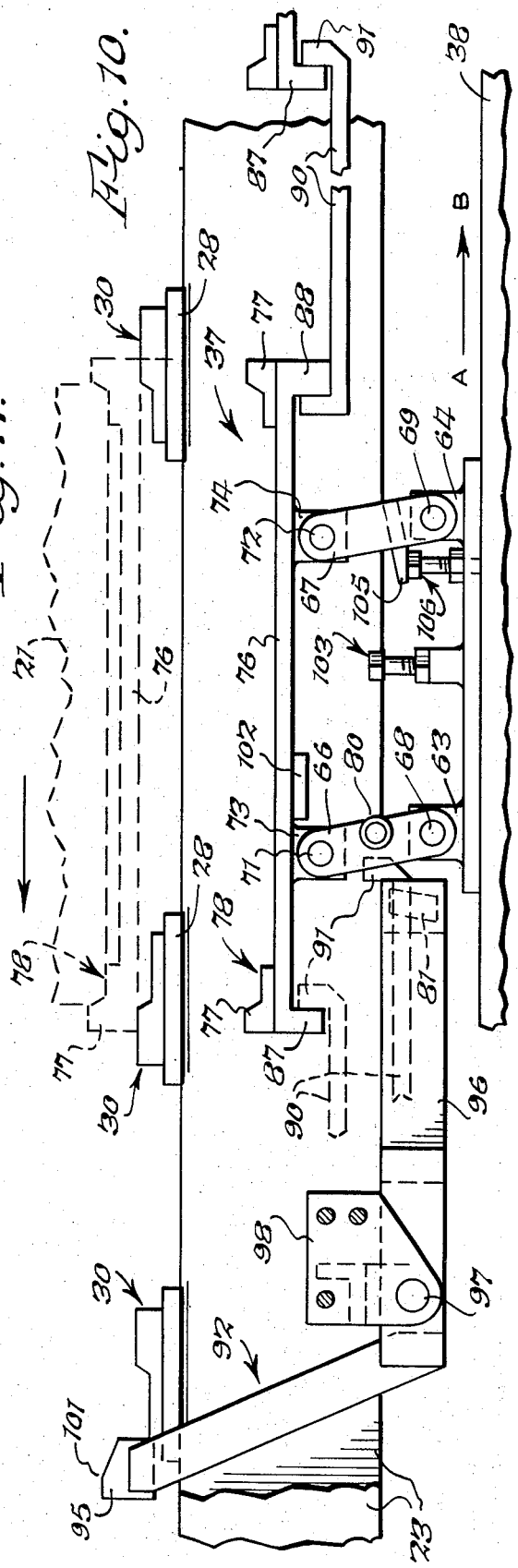

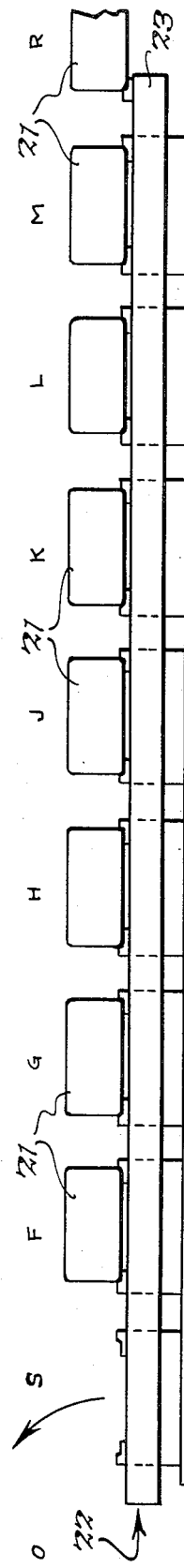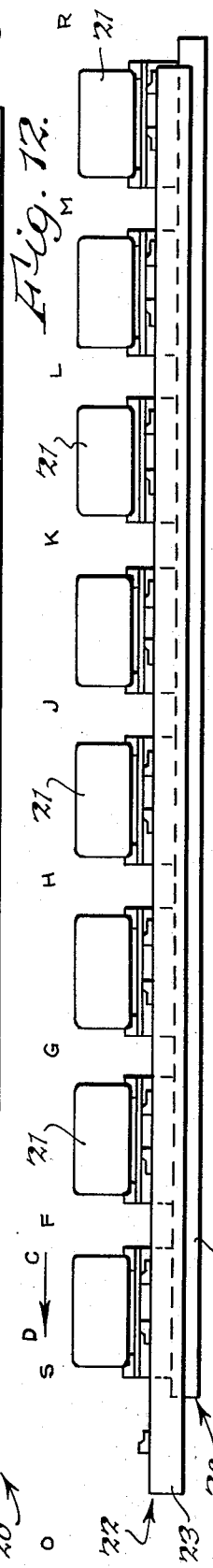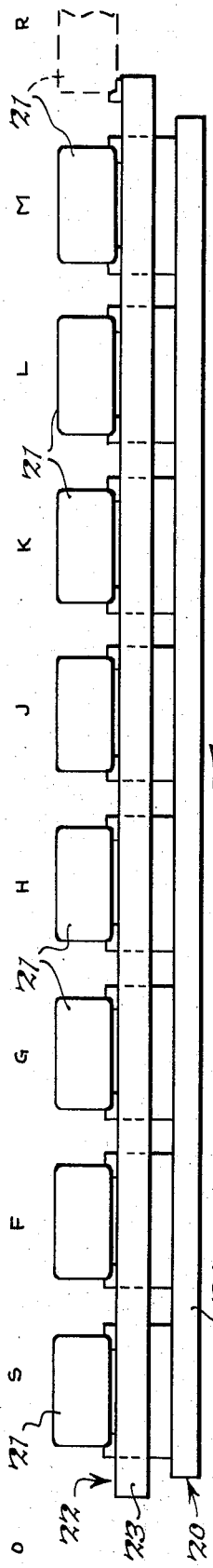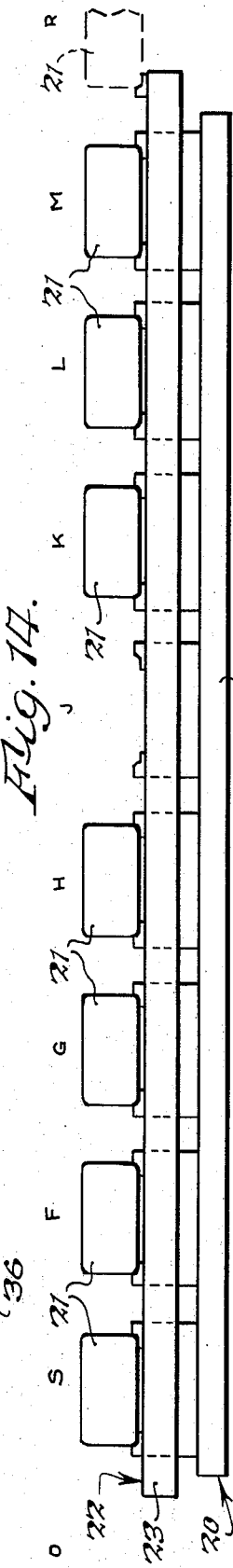

ACCUMULATING TRANSFER CONVEYOR

BACKGROUND OF THE INVENTION

This invention relates generally to the conveyor art and, more particularly, to a transfer conveyor of the accumulating type.

Generally, articles are transferred by conveyors of the non-accumulating type. Such conveyors require continuous removal of articles from the discharge end to avoid jamming and article spill-over. When removal is not continuous, the conveyor frequently must be shut down. This interrupts not only the conveyor operation but also the preceding operations leading to the conveyor, notwithstanding that there may be space available for additional articles on the conveyor during such shut down.

My prior U.S. Pats. Nos. 3,322,259, 3,355,008 and 3,499,524 are directed to accumulating transfer conveyors, which obviate the above noted disadvantages by accumulating articles thereon and continue to receive and advance articles along the conveyor until all available positions thereon are filled, even though the article at the conveyor discharge is not removed. These conveyors need not be shut down, notwithstanding that all article receiving positions on such conveyors are filled. These conveyors employ fluid control systems and fluid lifting arrangements including hydraulic or pneumatic article sensing switches and fluid means operable in response to the presence of an article blocking one position for disabling the preceding transfer means to prevent transfer of the preceding article onto the blocked position.

However, in the event of a malfunction in the fluid pressure system, troubleshooting becomes difficult in specifically locating or pinpointing the problem which may occur as a result of fluid leakage within the closed system or a defect in any one of a number of components of the system, including the fluid pressure switches and disabling means, which are susceptible to contamination and may function in an erratic manner. Moreover, troubleshooting and the subsequent remedial action necessary generally require the services of a skilled technician.

Mechanical accumulating conveyors are known. However, so far as I am aware in practice they have been of the push type and generally speaking are not practical for conveying articles having either finished or highly irregular bottom surfaces.

SUMMARY OF THE INVENTION

The accumulating transfer conveyor of the present invention, as hereinafter described, avoids the above problems by providing a simple, rugged and inexpensive mechanical accumulating transfer conveyor of the lift and carry type and of general utility having mechanical components only, thereby reducing the possibility of malfunction and, in the event of manfunction, such components are readily observed visually to facilitate troubleshooting and repair, which can be efficiently performed by unskilled personnel.

The accumulating transfer conveyor of this invention is characterized by the provision of a conveyor frame adapted to support articles at a plurality of rest positions therealong, a transfer mechanism associated with each position for lifting and advancing articles from one position to successive positions toward the conveyor discharge, an article sensing arm mechanically connected to a disabling arm associated with each position so that the presence of an article blocking one position displaces the disabling arm in a manner disabling the preceding transfer means, precluding transfer of the preceding article to said one position.

BRIEF DESCRIPTION OF THE DRAWINGS

FIG. 1 is a top plan view of an accumulating transfer conveyor of the present invention;

FIG. 2 is a side elevational view thereof;

FIG. 3 is a diagrammatic view of the path of travel of the conveyor carriage;

FIG. 4 is a vertical sectional view, on an enlarged scale, taken about on line 4—4 of FIG. 2;

FIG. 5 is a fragmentary longitudinal sectional view, on an enlarged scale, illustrating the sensor arm and disabling arm in a disabling position;

FIG. 6 is a fragmentary, enlarged plan view, on the end portion of the accumulating conveyor shown in FIG. 1;

FIG. 7 is a fragmentary, side elevational view with portions broken away of the conveyor end portion of FIG. 6, illustrating an article transfer mechanism;

FIG. 8 is a fragmentary side elevational view of a transfer mechanism in the collapsed or knocked-down position;

FIG. 9 is a view similar to FIG. 8, showing the transfer mechanism in an intermediate raised position;

FIG. 10 is a fragmentary side elevational view, showing the transfer mechanism in its fully raised position in readiness for the article lifting operation;

FIG. 11 is a fragmentary plan view of the transfer mechanism and associated components of FIG. 10;

FIG. 12 is a schematic side elevational view of the accumulating conveyor of FIG. 1, showing articles positioned at rest thereon;

FIG. 13 is a view similar to FIG. 12, showing the articles in transit between their initial rest positions and successive rest positions;

FIG. 14 is a view similar to FIG. 12, showing the articles deposited at successive rest positions; and FIG. 15 is a view similar to FIG. 14, showing an article removed from one of the intermediate rest positions.

DETAILED DESCRIPTION OF AN ILLUSTRATIVE EMBODIMENT

Referring now in detail to the illustrative embodiment depicted in the drawings, there is shown in FIGS. 1 and 2 an accumulating transfer conveyor apparatus, generally designated 20, adapted to receive articles 21 from an input or article receiving station R and to advance the same along the conveyor intermittently in a step-by-step fashion between adjacent article rest positions to a discharge station S, from which articles are removed and transferred to an output station O. Station R is formed in part on the leading end of conveyor 20, the other part forming an end portion of an adjacent input machine or conveying means (not shown) from which an article 21 is to be lifted and transferred to conveyor 20. Insofar as the present invention is concerned, it is immaterial as to the mechanism involved in placing articles at station R or the apparatus to which articles are conveyed at the output end 0. Suffice it to say that both the input and output may be random so that at times an article will not be placed at the article receiving station R and similarly that an article will not be removed from the output O.

Conveyor 20 comprises a base frame 22 including a pair of transversely spaced side members 23 extending the length of conveyor 20 and supported by a plurality of longitudinally spaced brackets 24 rigidly secured to the upper ends of upright support members 25. Frame 22 also includes transversely spaced, elongated channel members 26 extending generally lengthwise of conveyor 20 between upright support members 25.

A plurality of longitudinally spaced, opposing pair of platforms 27 and 28 are mounted on side members 23 and extend inwardly therefrom toward each other, as shown in FIGS. 1, 4 and 11. Each platform 27, 28 carries a work supporting bracket 30 having an upper, raised portion 31 (FIGS. 6 and 7) and a lower article supporting portion 32 joined to portion 31 by an inclined shoulder 33. Two opposed pairs of brackets 30 constitute a stationary perch assembly 35 for supporting one article 21 as shown in FIG. 7, with each bracket 30 supporting one of the four corners of the latter at one of its rest positions.

The article advancing means includes a carriage 36 carrying a plurality of article transfer mechanisms, generally designated 37, adapted to intermittently lift and carry each article 21 along conveyor 20 from one rest position to succeeding article rest positions, as will hereinafter be explained. Carriage 36 and the article transfer mechanisms 37 carried thereby are moved in a rectangular path which includes a horizontal direction toward the conveyor receiving station R, a vertical upward direction, a return horizontal direction toward the conveyor discharge station S, and a return downward vertical direction to close the rectangular path. FIG. 3 diagrammatically illustrates the movement of carriage 36 from a starting position A through such rectangular path, which includes positions B, C, D, E and then back to starting position A.

Carriage 36 comprises a pair of transversely spaced, longitudinally extending side members 38 supported by rollers 40 (FIG. 4), thereby adapting carriage 36 for reciprocating movement lengthwise of conveyor 20 and reciprocating movement vertically relative to conveyor 20. The drive means for reciprocating carriage 36 in a horizontal direction comprises a two-way fluid actuated cylinder 41 pivotally mounted on support brackets 42 carried by a cross bar 43 secured at its opposite ends to channel members 26. A piston rod 45 extends outwardly from cylinder 41 and is connected to a drive bracket 46 depending from carriage 36 for reciprocating the latter in a horizontal direction on rollers 40 relative to frame 22.

The means for raising and lowering carriage 36 relative to frame 22 includes a pair of bellcrank assemblies 47 fulcrumbed about shafts 48 journalled for rotation at their opposite ends in trunnions 50 securely fixed to channel members 26. Each bellcrank assembly 47 comprises a pair of laterally spaced upper arms 51 (FIG. 4) to which rollers 40 are secured by suitable fasteners 52. The distal ends of arms 51 are provided with bearing plates 53 facilitating sliding movement between arms 51 and carriage side members 38 in the event of contact therebetween.

Each bellcrank assembly 47 also is provided with a pair of laterally spaced lower arms 55. An adjustable connecting rod 56 is connected at its opposite ends to the distal ends of lower arms 55 of bellcrank assemblies 47, as at 57 in FIG. 2, to cause bellcrank assemblies to move in unison in arcuate paths. The means for actuating bellcrank assemblies 47 include a fluid actuated cylinder 58 suitably mounted between channel members 26. A piston rod 60 extends outwardly from cylinder 58 and is provided with an adjustable end connection 61 secured between lower arms 55 of one of the bellcrank assemblies 47. More specifically piston rod 60 is connected to the left hand bellcrank assembly 47, as viewed in FIG. 2. Of course, actuation of the left hand assembly 47 in either direction will effect a similar movement of the other bellcrank assembly 47 through the common connecting rod 56. In raising carriage 36, piston rod 60 is extended to move bellcrank assemblies 47 in a clockwise direction, causing rollers 40 to be moved in an arcuate path. The engagement of rollers 40 with the lower edges of carriage side members 38 lift carriage 36 vertically upwardly as rollers 40 move relative to the former in their arcuate paths in a clockwise direction. Carriage 36 is lowered by retracting piston rod 60 to move bellcrank assemblies 47 and rollers 40 in a counterclockwise arcuate path.

Proper sequencing of the operation of cylinders 41 and 58 for moving carriage 36 in its rectangular path can be effected by conventional limit switches (not shown), which are actuated upon predetermined movements of carriage 36 in horizontal and vertical directions. Each of these switches can trigger the subsequent stage of operation of cylinders 41 and 58 and thereby the movement of carriage 36. The number of switches, their positioning, etc. is conventional and it is believed no further amplification or description is necessary.

As shown in FIGS. 7-11, each article transfer mechanism 37 comprises a base 62 rigidly secured to the upper surfaces of carriage side members 38 and provided with a pair of longitudinally spaced, transversely extending lugs 63 and 64. Paired links 66 and 67 are pivotally mounted at their one ends to lugs 63 and 64 by pivot pins 68 and 69, respectively. The other ends of links 66 and 67 are pivotally mounted, as by means of pins 71 and 72, to a pair of lugs 73 and 74 depending from a movable lifting platform 76. Links 66 and 67, together with base 62 and platform 76, form a parallelogram linkage permitting arcuate movement of platform 76 relative to its base 62. A pair of longitudinally spaced brackets 77 are secured on the upper surface of platform 76 at the opposite ends thereof and form therewith a movable perch assembly 78 adapted to be reciprocated vertically between platform 27 and 28 for engaging the underside of an article and lifting it from the stationary perch assembly 35, as will hereinafter appear. Links 66, 67 are adapted to be swung in a counterclockwise direction, as viewed in FIGS. 7-10, to elevate perch assembly 78 relative to base 62 from a knock-down or disabled position shown in FIG. 8 to the operative position shown in FIG. 10.

The means for actuating links 66 and 67 in a counter clockwise direction includes a cam roller 80 mounted on the outer side of one of the links 66 (facing platform 27) of each transfer mechanism 37 engagable with an abutment member or dog 81 (FIGS. 8 and 9) adapted to be positioned in the path of travel of roller 80 when carriage 36 is moved to the right in the direction of arrow A-B in FIG. 8. Dog 81 constitutes a part of a disabling means, hereinafter described.

Provision is made for actuating links 66 and 67 in a clockwise direction to retract or lower perch assemblies 78 to a collapsed or knocked-down position. To this end, a cam follower in the form of a roller 82 is mounted on the other side of the link 67 facing platform 28 of the article transfer mechanism 37 located at the extreme right end portion of conveyor 20, as shown in FIGS. 6 and 7, adjacent the article receiving station R. Roller 82 is engagable with an inclined cam surface 83 formed on bracket 85 secured to the inner wall surface of frame side member 23 by suitable fasteners 86. Thus, when the foremost article transfer mechanism 37 is lowered by the downward movement of carriage 36, in the direction of arrow D–E in FIG. 7, roller 82 engages cam surface 83 and is urged in a clockwise direction, carrying links 67 therewith to move the latter in an arcuate clockwise direction collapsing the same, thereby lowering platform 76 relative to its associated base 62 to the collapsed position shown in FIG. 7. Each platform 76 is interlocked with an adjacent platform 76 in such a manner as to effect lowering of all platforms 76 in unison. To this end, each platform 76 (FIG. 11) is provided with a depending flange 87 at its leading edge and a depending flange 88 at its trailing edge, the leading edge facing the direction of article conveyance or opposite that of the arrow A–B in FIG. 10. An extension member 90 of a generally U-shaped configuration is welded or otherwise fixedly secured at one end thereof to trailing edge flange 88, the other end being provided with a hook portion 91 engagable behind the leading edge flange 87 of the preceding platform 76. Accordingly, downward arcuate movement of the foremost platform 76, i.e., the platform adjacent station R, carries with it the next adjacent succeeding platform 76, and so on down the line in a manner knocking down or collapsing all platforms 76 upon the lowering of carriage 36.

An article sensor, generally designated 92, is provided at each article rest position for sensing the presence of an article at that position. In the illustrated form, article sensor 92 comprises an arm 93 (FIGS. 10 and 11) having an upper extension 95 normally projecting upwardly into the space occupied by articles at rest for abutting the undersides thereof, the arm 93 being depressed by such articles 21. Arm 93 is carried at its lower end by an elongated disabling arm 96 pivotally mounted at 97 on a gusset plate 98 secured to frame side member 23. The weight of the cantilevered extension of disabling arm 96 causes it to be normally disposed in a horizontal direction. The distal end of arm 96 is provided with a plate 100 to which dog 81 is attached. Sensor arm 93 is depressed when an article 21 abuts the article engaging surface 101 of arm 93 to pivot disabling arm 96 upwardly, positioning dog 81 above the path of travel of links 66, as shown in FIG. 5. Consequently, cam roller 80 passes beneath dog 81 upon movement of links 66 to the right, or in the direction of arrow A–B in FIG. 5, maintaining the associated platform 76 and perch assembly 78 in a disabled or knock-down condition to prevent advancement of a preceding article 21 onto the blocked position. Thus, article sensing and transfer disabling are effected by a relatively simple mechanical arrangement, avoiding the use of complex pneumatic, hydraulic or electrical control circuits. When no article is present on stationary perch assembly 35 at a given article rest position, sensor arm 93 is biased into its upper position by means of the weighted disabling arm 96, as shown in FIG. 10. With disabling arm 96 oriented horizontally, dog 81 is positioned ahead of cam roller 81 in the path of movement thereof (FIG. 8) for engaging the latter to shift links 66 and thereby platform 76 and perch assembly 78 into an elevated, operative position upon movement of carriage 36 towards the right as indicated by arrow A–B in FIG. 8.

Each platform 76 is provided with a pad 102 secured to the underside thereof for engagement with an adjustable stop 103 mounted on base 62 for limiting downward movement of platform 76 relative to its associated base 62, as shown in FIGS. 7 and 8. A projecting stop element 105 is secured between links 67 of end transfer mechanism 37 for engagement with a second adjustable stop 106 mounted on base 62 for limiting the rearward arcuate movement of links 67 in a counterclockwise direction and thereby fixing the height of platform 67 in its operative position relative to its associated base 62.

In the illustrative embodiment of FIGS. 1 and 2, nine exemplary article rest positions are provided on conveyor 20. These article rest positions are identified in FIG. 12 at F,G,H,J,K,L,M and include article receiving rest position R and article discharge rest position S. It should be understood that any number of rest positions can be employed, as desired, within the economics of design. Each rest position includes an article transfer mechanism 35 incorporating a movable perch assembly 37, a sensor 92 and a disabling means 96.

Assuming, for illustrative purposes, that carriage 36 is at position A in FIG. 3 and that there are articles 21 on rest positions F through R with discharge rest position S unoccupied as shown in FIG. 12, the mode of operation of conveyor 20 is as follows:

The carriage drive including cylinder 41 and piston rod 45 is actuated by known fluid means to advance carriage 36 along rollers 40 in the direction of arrow A–B in FIG. 3. Since there is no article at article discharge rest position S, the sensor arm 93 associated therewith is disposed in its extended position with disabling arm 96 oriented in a horizontal direction, positioning dog 81 in the path of movement of roller 80 as shown in FIG. 8. Movement of links 66 along with carriage 36 in the direction A–B causes roller 80 to engage dog 81, actuating links 66 and 67 in an arcuate counterclockwise direction, lifting platform 76. Links 66 and 67 move past a vertically extended position until finger element 105 engages stop 106, as shown in FIG. 10, bringing platform 76 and perch assembly 78 into its raised operative or set-up position shown in FIG. 10 and in phantom at X in FIG. 4. The platforms 76 associated with preceding article rest positions F through R will be elevated by the interlock arrangement defined by each extension member hook portion 91 engaging behind flange 87 of the preceding next adjacent platform 76. Thus, the transfer mechanisms 37 associated with the unoccupied rest position S, and all preceding transfer mechanisms 37 will be shifted to the right and elevated to operative set-up positions, identified at X in FIG. 4, during their course of horizontal movement from position A to position B to condition transfer mechanisms 37 in readiness for the article lifting operation.

At position B, the carriage elevating drive, including cylinder 58 and piston rod 60, becomes operative by known fluid means to raise carriage 36 relative to frame side members 23. Movable perch assemblies 78 engage the underside of the articles at rest positions F through R and lift articles 21 from stationary perch assemblies 35 associated with these rest positions until carriage 36 reaches position C (FIG. 3). FIGS. 4 and 10 illustrate in phantom at Y the elevated position of a movable perch assembly 78 relative to its associated stationary perch assembly 35 when set-up or conditioned as described above for the article lifting operation. Retraction of piston rod 45 into cylinder 41 causes carriage 36 to advance on rollers 40 in the direction of arrow C-D (FIGS. 3 and 13) until carriage 36 reaches the end of its advancing stroke at position D.

At position D, piston rod 60 is retracted within cylinder 58 to lower carriage 36 to position E, leaving articles 21 at rest on stationary perch assemblies 35 at rest positions S through M, as shown in FIG. 14. During the lowering of carriage 36, roller 82 of link 67 of the endmost transfer mechanism 37 adjacent article receiving station or rest position R engages the inclined cam surface 83, causing links 67 and thereby platfrom 76 to move in an arcuate clockwise direction to the knock down position shown in FIG. 7, whereby platfrom lug 102 engages stop 103. All the successive platforms 76 also will be lowered to a knock down position through the interlock arrangement defined by flanges 87 at the leading edge of platforms 76 engaging behind extension member hook portions 91 of the succeeding next adjacent platfroms 76. This knock down action occurs during the lowering of carriage 36 from position D to position E (FIG. 3). Carriage 36 is then shifted horizontally to its initial starting position A in readiness for the next cycle of operation. During this described cycle, another article 21, shown in phantom in FIG. 14, may be placed at article rest position R for the subsequent cycle whereby all articles 21 are advanced one rest position with the article at discharge rest position S being transferred to output station O. Thus, each article delivered to conveyor 20 is intermittently advanced therealong from the input station at article receiving rest position R to the output station O.

Conveyor 20 also is operative to disable individual article transfer mechanisms 37 in a manner accumulating the articles on conveyor 20. Assuming, for illustrative purposes, that there are articles at all rest positions except rest position J (FIG. 15) and that the article disposed at the output station O to the left of position S is not removed and is blocking the conveyor. Movement of carriage 36 in the direction A-B will not effect actuation of links 66 of transfer mechanisms 37 moving toward positions S, F, G, H, and J since the dogs 81 of their associated disabling arms 96 are displaced from the path of movement thereof (FIG. 5) due to the presence of articles 21 at all of the succeeding rest positions depressing the associated sensor arms 93. However, in the absence of an article at rest position J, the associated sensor arm 93 is disposed in its elevated position with disabling arm oriented horizontally so that its dog 81 projects into the path of movement of link roller 80 of the associated transfer mechanism 37. Consequently, the transfer mechanism 37 associated with position J and moving toward rest position K, together with all of the other preceding transfer mechanisms 37, are actuated into their operative positions upon movement of carriage 36 in the direction A-B and upon vertical movement of the latter, the perch assemblies 78 of these conditioned transfer mechanisms 37 will engage and remove articles from the stationary perch assemblies at rest positions K through R. Upon subsequent movement of carriage 36 through the advance stroke C-D and the lowering stroke D-E, such displaced articles 21 will be advanced and then deposited on stationary perch assemblies 35 at advanced rest positions J through M. The succeeding transfer members 37 to the left of rest position J, as viewed in FIG. 15, are maintained in a disabled condition because of the presence of articles 21 at their associated rest positions. Accordingly, even though they are shifted and raised along with carriage 36 from the solid line position to the position shown in phantom at Z in FIG. 14, they are not effective to remove articles 21 from rest positions H through S and pass beneath these articles on the advance stroke C-D of carriage 36. Thus, it is apparent that accumulation will take place when any position is empty, and that conveyor 20 need not be shut down even when all positions are filled.

A significant feature of the conveyor of the present invention resides in the use of a simple, purely mechanical arrangement for advancing articles intermittently along the conveyor in a step-by-step fashion between adjacent article rest positions from an article receiving station to an article discharge station and also provides for accumulation of articles thereon when any rest positions are unoccupied. This mechanical arrangement is especially reliable because of the direct mechanical transmission between the various moving parts, including the article sensing and disabling means, thereby avoiding the use of elaborate and complex control systems which are highly sensitive and more susceptible to malfunction. The problems customarily associated with troubleshooting are virtually eliminated because any malfunction or mechanical failure can be readily observed visually by unskilled personnel. Moreover, all the components forming the conveyor are easily accessible facilitating maintenance, servicing and repair.

Also, it is a significant feature of this invention that the foregoing is provided in a conveyor of the lift and carry type, whereby it can be used with a wide variety of articles including those whose undersurface would be damaged by sliding and those whose configuration does not permit sliding.

A preferred form of this invention having been described in detail, it is to be understood that this has been done by way of illustration only.

I claim:

1. In an accumulating transfer conveyor of the lift and carry type having a frame adapted to support articles at a plurality of rest positions therealong and a carriage mounted for movement in a rectilinear path relative to said frame, a transfer mechanism for advancing an article from one rest position to a succeeding adjacent rest position comprising: a base mounted on said carriage for movement therewith; a platfrom overlying said base; connecting means comprising a plurality of movable links pivotally connected at the opposite ends thereof to said base and said platfrom for extending and collapsing said platfrom into said operative and disabled positions; abutment means mounted on said frame; and at least one of said links having means engagable with said abutment means upon movement of said carriage in a first direction for pivoting said links in one arcuate direction to extend said platfrom into an operative position whereby said transfer mechanism is conditioned to remove an article from one of said rest positions upon subsequent movement of said carriage in a second direction normal to said first direction.

2. A transfer mechanism according to claim 1 including a pair of spaced article supporting brackets mounted on opposite ends of said platform forming a movable perch assembly therewith engagable with articles at rest on said frame for lifting said articles from said rest positions.

3. A transfer mechanism according to claim 1 including a disabling arm pivotally mounted on said frame and provided with said abutment means adjacent one end thereof normally disposed in the path of travel of said link engagable means for engagement therewith.

4. A transfer mechanism according to claim 1 wherein said plurality of links form with said base and said platform a parallelogram linkage.

5. A transfer mechanism according to claim 1 including adjustable stop means engagable by said platform limiting pivotal movement of said links in said one direction.

6. A transfer mechanism according to claim 1 including a cam follower on another one of said links engagable with a cam surface on said frame for pivoting said links in an opposite direction to lower said platform into a disabled position upon movement of said carriage in a direction opposite said second direction.

7. A transfer mechanism according to claim 6 including adjustable stop means limiting pivotal movement of said links in said opposite direction.

8. A transfer mechanism according to claim 1 wherein said connecting means comprises a pair of links adjacent each end of said base pivotably connected at the opposite ends thereof to said base and said platform for forming a parallelogram linkage.

9. A transfer mechanism according to claim 1 including article sensing means associated with said transfer mechanism and operable in response to the presence of an article blocking one of said rest positions to prevent actuation of said links and maintain said platform in a disabled position preventing the transfer of an article from a preceding rest position to said blocked position.

10. A transfer mechanism according to claim 9 wherein said sensing means comprises a sensor arm having an end projecting into the space normally occupied by an article at the associated rest position, a disabling arm, the other end of said sensor arm being connected to one end of said disabling arm, the other end of said disabling arm being provided with said abutment means normally disposed in the path of travel of said link engagable means for engagement therewith and movable out of said path of travel upon displacement of said disabling arm and said sensor arm by the presence of an article at said associated rest position.

11. An accumulating transfer conveyor of the lift and carry type comprising: a conveyor frame adapted to support articles at a plurality of rest positions therealong; a carriage mounted for movement in a rectangular path relative to said conveyor frame; a series of longitudinally spaced transfer mechanisms associated with said rest positions and mounted on said carriage for advancing articles from a first position to successive next adjacent positions; each of said transfer mechanisms comprising a base secured to said carriage, a platform, and pivotal links interposed between and connected at the opposite ends thereof to said base and said platfrom; said links being movable in opposite arcuate directions for extending and collapsing said platform into operative and disabled positions, respectively; sensing means associated with each rest position; sensing means associated with each rest position; a disabling arm connected to said sensing means and having means normally disposed in the path of movement of the associated transfer mechanism to engage said links upon movement of said carriage in a first direction to pivot said links in one arcuate direction and extend said platfrom of an associated transfer mechanism into an operative position whereby said transfer mechanism is conditioned to remove an article from the preceding rest position upon subsequent movement of said carriage in a second direction normal to said first direction.

12. A conveyor according to claim 11, together with means interlocking preceding transfer mechanisms with said associated transfer mechanism to extend said preceding transfer mechanisms into operative positions.

13. A conveyor according to claim 11 wherein said sensing means is operable in response to the presence of an article blocking one of said positions to displace said disabling arm means out of the path of movement of the associated transfer mechanism links upon movement of said carriage in said one direction thereby maintaining said associated transfer mechanism in a disabled position.

14. A conveyor according to claim 11 wherein said sensing means comprises a sensor arm having one end projecting into the space normally occupied by an article at said associated rest position, the other end of said sensor arm being connected to one end of said disabling arm, said means on said disabling arm comprising an abutment member mounted on the other end thereof.

15. A conveyor according to claim 11, together with drive means for moving said carriage in said rectangular path including said first direction whereby said transfer mechanisms are extended into operative positions, said second direction to cause said transfer mechanisms to lift articles from preceding next adjacent rest positions, a third direction opposite said first direction for advancing said transfer mechanisms and articles carried thereby to succeeding article rest positions, and a fourth direction opposite to said second direction causing said articles to be deposited on succeeding next adjacent rest positions.

16. A conveyor according to claim 15 including means for actuating said platfroms of said transfer mechanisms for operative positions to disabled positions upon movement of said carriage in said fourth direction 17. A conveyor according to claim 16 wherein said disabling actuating means comprises cam means on at least one of the links of the endmost preceding transfer mechanism engagable with a cam surface provided on said frame to pivot said links in an opposite arcuate direction and collapse said platfrom of said endmost transfer mechanism into a disabled position.

18. A conveyor according to claim 17, together with means interlocking succeeding transfer mechanisms with said endmost transfer mechanism to collapse said platforms of said succeeding transfer mechanisms into disabled positions.

* * * * *